United States Patent
Woelfel (10) Patent No.: US 12,253,139 B2
(45) Date of Patent: Mar. 18, 2025

(54) DUAL LIVE VALVE SHOCK HAVING MAIN DAMPER AND BASE VALVE ACTIVELY CONTROLLED

(71) Applicant: Fox Factory, Inc., Duluth, GA (US)

(72) Inventor: Regan Woelfel, Scotts Valley, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/023,948

(22) Filed: Sep. 17, 2020

(65) Prior Publication Data

US 2021/0088100 A1 Mar. 25, 2021

Related U.S. Application Data

(60) Provisional application No. 62/902,866, filed on Sep. 19, 2019.

(51) Int. Cl.
| | | |
|---|---|---|
| B60G 17/016 | (2006.01) | |
| B60G 13/06 | (2006.01) | |
| B60G 17/056 | (2006.01) | |
| F16F 9/46 | (2006.01) | |

(52) U.S. Cl.
CPC .............. *F16F 9/466* (2013.01); *B60G 13/06* (2013.01); *B60G 17/056* (2013.01); *B60G 2202/24* (2013.01); *B60G 2500/11* (2013.01)

(58) Field of Classification Search
CPC ..... F16F 9/44; F16F 9/46; F16F 9/446; B60G 13/06; B60G 17/015; B60G 17/019; B60G 17/08; B62J 45/20
USPC ...... 188/266.1, 266.2, 266.5, 281, 285, 286, 188/322.13, 322.2, 299.1
See application file for complete search history.

(56) References Cited

U.S. PATENT DOCUMENTS

| | | |
|---|---|---|
| 3,986,118 A | 10/1976 | Madigan |
| 4,773,671 A | 9/1988 | Inagaki |
| 4,984,819 A | 1/1991 | Kakizaki et al. |
| 5,027,303 A | 6/1991 | Witte |
| 5,105,918 A | 4/1992 | Hagiwara et al. |
| 5,390,949 A | 2/1995 | Naganathan et al. |
| 5,952,823 A | 9/1999 | Sprecher et al. |

(Continued)

FOREIGN PATENT DOCUMENTS

| | | |
|---|---|---|
| CN | 101048607 A | 10/2007 |
| CN | 105051404 A | 11/2015 |

(Continued)

OTHER PUBLICATIONS

ISA/KR, International Search Report and Written Opinion for International Application No. PCT/US2020/051338, Dec. 23, 2020, 14 Pages.

(Continued)

*Primary Examiner* — Christopher P Schwartz (57) ABSTRACT

A vehicle damper assembly is disclosed. The damper includes a reservoir, a cylinder having an inner diameter (ID) and fluidly coupled with the reservoir and a rod and a piston. The piston coupled to the rod and configured to divide the cylinder into a compression side and a rebound side. The damper further includes an active base valve to provide independent flow control for a reservoir flow path between the cylinder and the reservoir. The damper also includes an active main valve to provide independent flow control for a piston flow path fluidly coupling the compression side with the rebound side.

19 Claims, 7 Drawing Sheets

(56) References Cited

U.S. PATENT DOCUMENTS

| | | |
|---|---|---|
| 6,244,398 B1 | 6/2001 | Girvin et al. |
| 6,427,812 B2 | 8/2002 | Crawley et al. |
| 6,446,771 B1* | 9/2002 | Sintorn .................. F16F 9/512 |
| | | 188/319.1 |
| 6,863,291 B2 | 3/2005 | Miyoshi |
| 6,935,157 B2 | 8/2005 | Miller |
| 7,374,028 B2 | 5/2008 | Fox |
| 8,627,932 B2* | 1/2014 | Marking .................. F16F 9/19 |
| | | 188/266.6 |
| 8,857,580 B2 | 10/2014 | Marking |
| 9,033,122 B2 | 5/2015 | Ericksen et al. |
| 9,035,477 B2* | 5/2015 | Tucker .................. F01C 9/002 |
| | | 290/1 R |
| 9,120,362 B2 | 9/2015 | Marking |
| 9,239,090 B2* | 1/2016 | Marking .................. F16F 9/516 |
| 9,347,511 B2* | 5/2016 | Kim .......................... F16F 9/34 |
| 9,353,818 B2* | 5/2016 | Marking .................. F16F 9/19 |
| 9,452,654 B2* | 9/2016 | Ericksen ................ B60G 17/08 |
| 9,611,915 B2* | 4/2017 | Park ...................... F16F 9/5126 |
| 10,086,673 B2 | 10/2018 | Baales et al. |
| 10,737,546 B2* | 8/2020 | Tong ........................ F16F 9/065 |
| 10,876,590 B2* | 12/2020 | Miwa ...................... F16F 9/185 |
| 10,962,081 B2* | 3/2021 | Sankaran ................ B60G 13/08 |
| 11,602,971 B2* | 3/2023 | Strickland .......... B60G 17/0528 |
| 2003/0127294 A1 | 7/2003 | Moradmand et al. |
| 2013/0341138 A1* | 12/2013 | Battlogg ................ F16F 15/002 |
| | | 188/267.1 |
| 2014/0027219 A1 | 1/2014 | Marking et al. |
| 2015/0377316 A1* | 12/2015 | Roessle ................ B60G 13/08 |
| | | 188/315 |
| 2017/0008363 A1 | 1/2017 | Ericksen et al. |
| 2017/0328440 A1* | 11/2017 | Sakuta ...................... F16F 9/46 |
| 2018/0281893 A1 | 10/2018 | Awano |
| 2019/0203798 A1 | 7/2019 | Cox et al. |
| 2020/0340545 A1* | 10/2020 | Strickland ............. F16F 9/3405 |
| 2022/0136580 A1* | 5/2022 | Shimauchi ................ F16F 9/34 |
| | | 188/322.5 |

FOREIGN PATENT DOCUMENTS

| | | |
|---|---|---|
| DE | 4007261 A1 | 9/1991 |
| DE | 102015211556 A1 | 12/2016 |
| EP | 0591754 A1 | 4/1994 |
| JP | H06173996 A | 6/1994 |
| KR | 20150019526 A | 2/2015 |
| KR | 20190082287 A | 7/2019 |

OTHER PUBLICATIONS

ISA/KR, International Preliminary Report on Patentability for International Application No. PCT/US2020/051338, Mar. 31, 2022, 9 Pages.

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

Canadian First Office Action for Canadian Application No. 3,154,858, 3 Pages, Mailed Nov. 14, 2023.

Chinese First Office Action for Chinese Application No. 20208006143.6, 20 Pages, Mailed Oct. 28, 2023.

European Search Report for European Application No. 20866834.3, 7 Pages, Mailed Sep. 22, 2023.

* cited by examiner

DUAL LIVE VALVE SHOCK HAVING MAIN DAMPER AND BASE VALVE ACTIVELY CONTROLLED

CROSS-REFERENCE TO RELATED APPLICATION (PROVISIONAL)

This Application claims priority to and benefit of U.S. Provisional Patent Application No. 62/902,866 filed on Sep. 19, 2019, entitled "Dual Live Valve Shock Having Main Damper And Base Valve Actively Controlled" by Regan Woelfel, and assigned to the assignee of the present application, the disclosure of which is hereby incorporated by reference in its entirety.

FIELD OF THE INVENTION

Embodiments of the present technology generally relate to a damper assembly for a vehicle.

BACKGROUND

Vehicle suspension systems typically include a spring component or components and a damping component or components. Typically, mechanical springs, like helical springs are used with some type of viscous fluid-based dampening mechanism and the two are mounted functionally in parallel. In some instances, features of the damper or spring are user-adjustable.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore into to be considered limiting of its scope, for the invention may admit to other equally effective embodiments.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Overview of Discussion

In one embodiment, a damper having an active base valve and an active main piston valve is disclosed. In one embodiment, the damper is modular such that it can use preexisting components of a similar sized damper. In one embodiment, the only modification to the damper would be the addition of the active base valve, the active main piston and a new shaft to work with the active main piston. The rest of the shock body remains modular.

In one embodiment, the active main valve and base valve damper is used in a modal situation (e.g., a straight current sent to valves), or in a semi-active situation, e.g., various sensor input that is provided to the ECU which uses the evaluation of the input to provide adjustments to the active valves. The active valve could be solenoid controlled such as an on/off solenoid. In one embodiment, the active valve is solenoid controlled with an infinitely adjustable range.

In general, the active main valve and base valve damper can be used for example, in whoops, where both the active valves would be opened to soften the suspension. In one embodiment, independent control for a number of shocks would be important for example in a turn where the outboard shocks would be stiffened for compression while the inboard shocks would be stiffened for rebound.

In one embodiment, the active main valve and base valve damper could be used on a vehicle such that in a turn, some dampers would be softened while others were stiffened to reduce body roll. For example, in a turn, the outboard shock would receive no current to the base valve (maintaining compression stiffness) and full current to the rebound portion of the main piston valve. This would keep the outboard shock stiff in compression while also softening the rebound.

In contrast, the inboard shock would receive no current to the rebound portion of the main valve and full current to the base valve (reducing compression stiffness). This would keep the inboard shock stiff in rebound while also softening the compression.

In one embodiment, the full current is 0.88 amps which opens the active valve to soften the damping. In a normally firm suspension setting, to make a valve soft (e.g., an open setting), full current would be applied.

In a washboard situation, the dampers could be stiffened or softened depending upon performance requirements, user preference, etc. In a Full extension scenario (e.g., jumping the vehicle) the dampers would harden the suspension for landing.

In one embodiment, the active main valve and base valve damper is shown in a monotube piggyback having a smaller form factor, however, the active main valve and base valve damper could also be applied in a twin tube, bypass configuration, bottom out cup configuration, etc.

In general, the active main valve and base valve damper can be used on an automobile, motorcycle, bicycle, electric bicycle, atv, snow machine, side by side, and the like. moreover, the active main valve and base valve damper could be used in conditions including, on-road, off-road, trail, and the like.

In one embodiment, the active main valve and base valve damper comes at a lower cost due to the removal of the twin tube design. In one embodiment, the active main valve and base valve damper disclosed herein also provides independent control of both compression and rebound damping.

In the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated actively (e.g., using a powered solenoid, or the like) to alter the operation or characteristics of a valve and/or other component. As a result, in the field of suspension components and valves, the terms "active", "active", "actively controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

As used herein, the terms "down", "up", "down-ward", "upward", "lower", "upper" and other direction references are relative and are used for reference only.

Figure 1A:
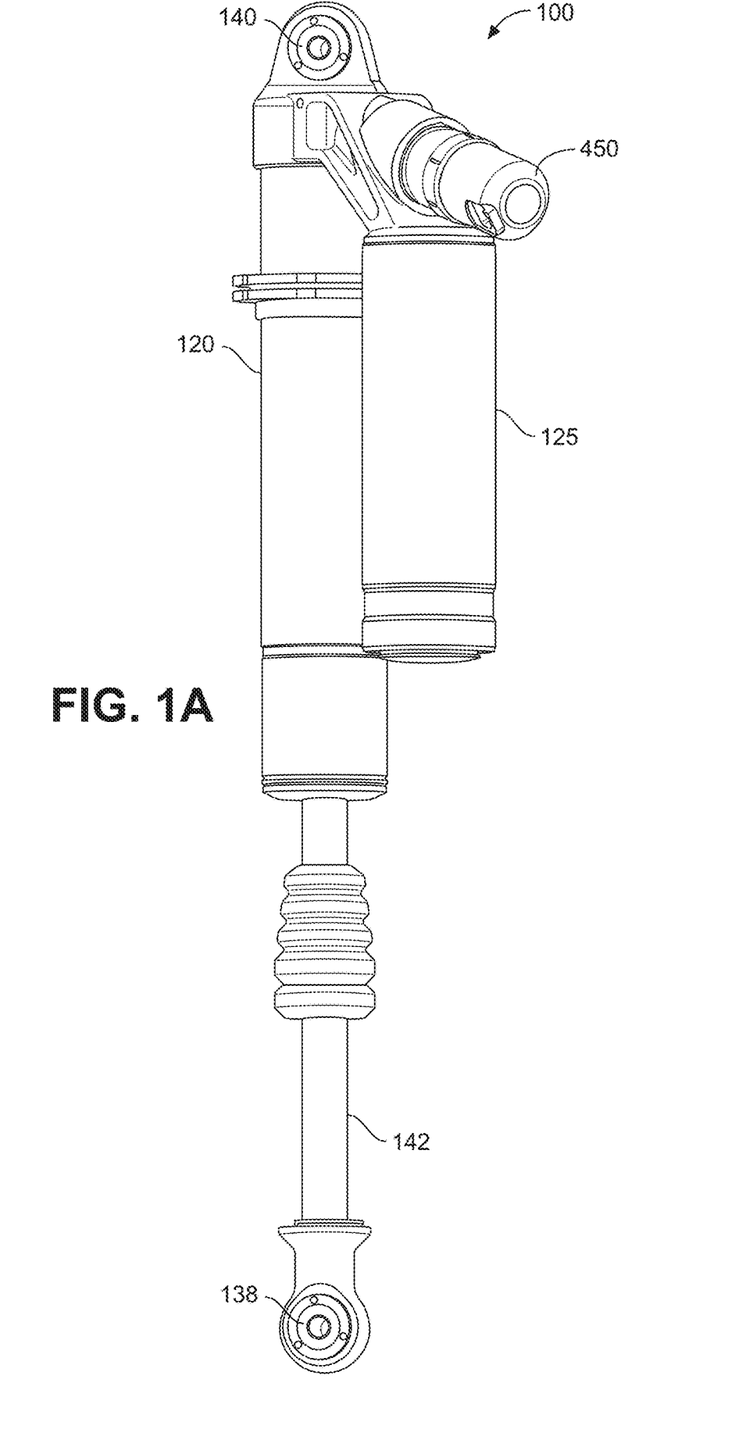
FIG. 1A is a perspective view of a vehicle suspension damper having an active main piston valve and an active base valve, in accordance with an embodiment.

FIG. 1A is a perspective view of an active main valve and base valve damper 100 having an active main piston valve and an active base valve. In one embodiment, active main valve and base valve damper 100 includes eyelets 140 and 138, cylinder 120 (e.g., a damper housing), piston rod 142, and piggyback (or external reservoir 125). In one embodiment, external reservoir 125 is described in U.S. Pat. No. 7,374,028 the content of which is entirely incorporated herein by reference.

Figure 1B:
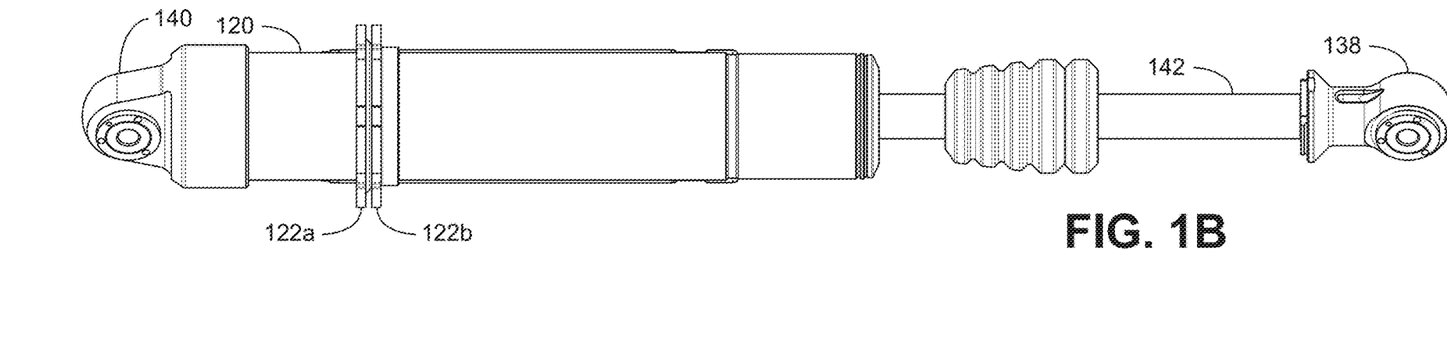
FIG. 1B is a perspective view of a vehicle suspension damper having an active main piston valve and an active base valve, in accordance with an embodiment.
Figure 1C:
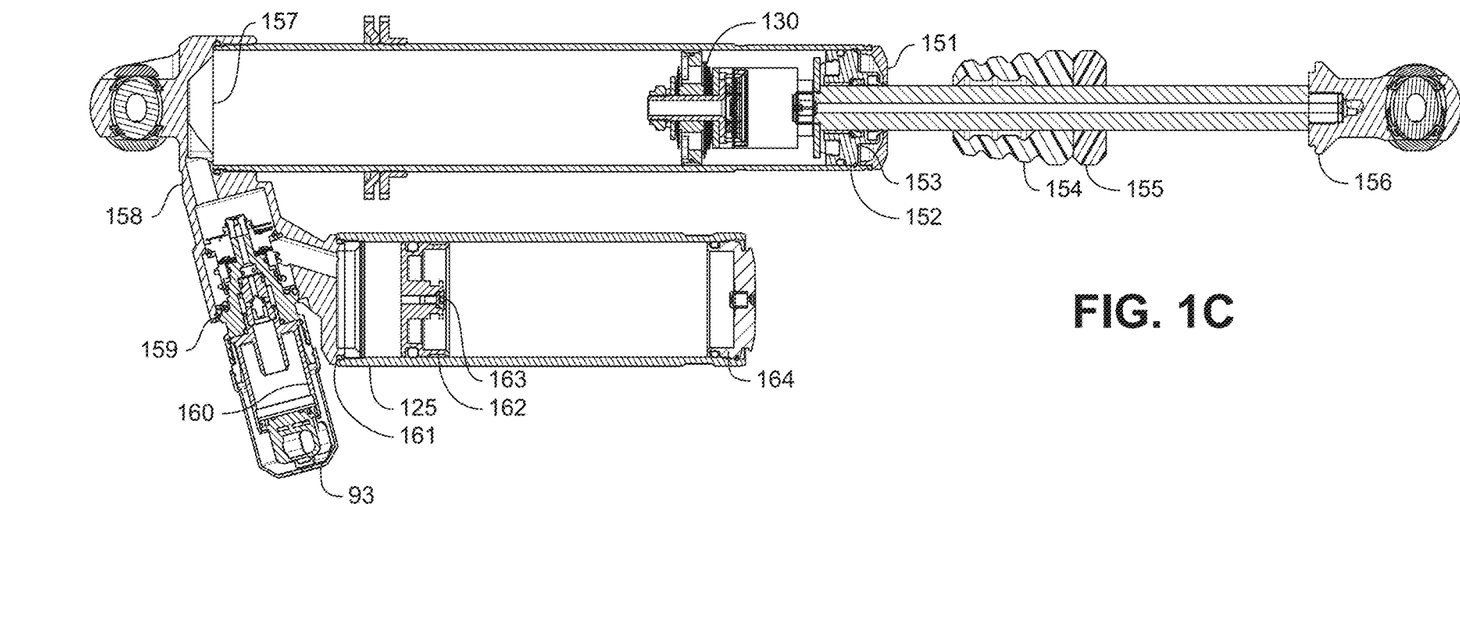
FIG. 1C is a side-sectional view of a vehicle suspension damper having an active main piston valve and an active base valve, in accordance with an embodiment.

In one embodiment, as shown in further detail in FIGS. 1B and 1C, cylinder 120 includes a piston and chamber and the external reservoir 125 includes a floating piston and pressurized gas to compensate for a reduction in volume in the main damper chamber of the vehicle suspension damper 100 as the piston rod 142 moves into the cylinder 120. Fluid communication between the main chamber of the damper and the external reservoir 125 may be via a flow channel including an adjustable needle valve. In its basic form, the damper controls the speed of movement of the piston shaft by metering incompressible fluid from one side of the damper piston to the other, and additionally from the main chamber to the external reservoir 125, during a compression stroke (and in reverse during the rebound or extension stroke).

Although a monotube is shown in FIG. 1A, this is provided as one embodiment and for purposes of clarity. In one embodiment, the active main valve and base valve damper 100 could be a different type such as, but not limited to, a coil sprung damping assembly, an air sprung fluid damper assembly, a stand-alone fluid damper assembly, and the like.

FIG. 1B is a perspective view of active main valve and base valve damper 100 having an active main piston valve and an active base valve, in accordance with an embodiment. FIG. 1C is a side-sectional view of the active main valve and base valve damper 100 having an active main piston valve and an active base valve in accordance with an embodiment.

Active main valve and base valve damper 100 of FIGS. 1B and 1C, includes cylinder 120, and piston rod 142 with an piston 130 mounted therewith. In one embodiment, active main valve and base valve damper 100 includes preload rings 122a and 122b that are used in conjunction with a helical spring.

The piston 130 is within the cylinder 120 and moves with the piston rod 142. Although a monotube type damper is shown in FIGS. 1A-1C, it is merely for purposes of clarity. It should be appreciated that active main valve and base valve damper 100 could be a twin tube, have a bypass, could include a bottom out control (BOC), etc. Certain features of reservoir type dampers are shown and described in U.S. Pat. No. 7,374,028, which is incorporated herein, in its entirety, by reference.

The upper portion of the piston rod 142 is supplied with a bushing set 138 for connecting to a portion of a vehicle component such as a wheel suspension linkage. In one embodiment, active main valve and base valve damper 100 uses an eyelet 140 to be mounted on another portion of the vehicle, such as the frame. In one embodiment, a spring member is used to act between the same portions of the vehicle as the vehicle suspension damper. As the piston rod 142 and the piston 130 move into the cylinder 120 (during compression), the working fluid slows the movement of the two portions of the vehicle relative to each other due, at least in part, to the incompressible fluid moving through a flow paths in the piston (in one embodiment past shims 220) provided in the active main piston valve 30 and/or through a flow path 256, as will be described in FIGS. 2. As the piston rod 142 and the piston 130 move out of the cylinder 120 (during extension or "rebound"), fluid meters again through flow paths 126 and the flow rate and corresponding rebound rate is controlled, at least in part, by the shims 210.

Referring still to FIG. 1C, in one embodiment, active main valve and base valve damper 100 includes some or all of, a bearing cap 151, a retaining ring 152, a bearing assembly 153, a bumper 154, a bumper 155, a eyelet rebound 156, an O-ring seal 157, a piggyback body cap 158, a retaining ring 159, a damping adjustment assembly 160, an O-ring 161, a floating piston assembly 162, a screw assembly 163, and a reservoir end cap assembly 164.

Main Piston Valve

Figure 2:
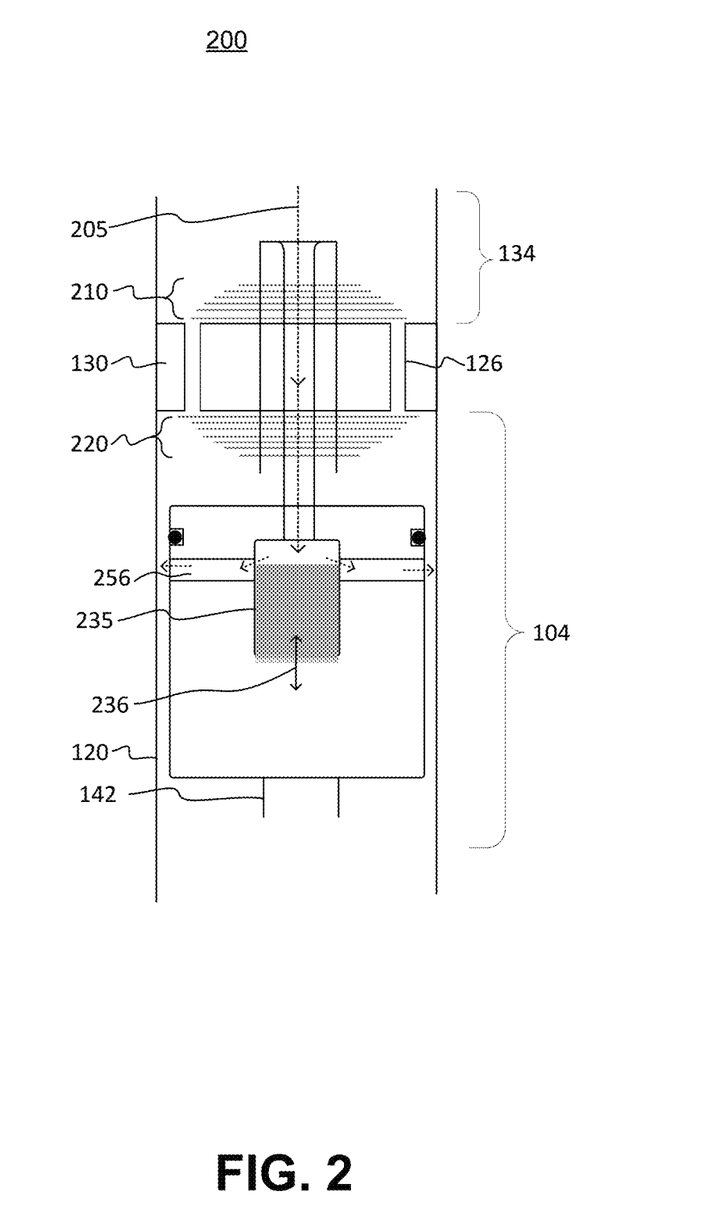
FIG. 2 is an enlarged section view showing flow through the main piston active valve, in accordance with an embodiment.

Referring now to FIG. 2, a section view 200 of the active main piston valve is shown in accordance with an embodiment. In general, piston 130 includes an oil flow path 205, compression valving (e.g., shims 210), rebound valving (e.g., shims 220), and an active main valve 235 in accordance with an embodiment.

In one embodiment, the fluid meters from one side of piston 130 to the other side by passing through flow paths 126 formed in piston 130. In one embodiment, compression valving (e.g., shims 210) and rebound valving (e.g., shims 220) are used to partially obstruct the flow paths 126 in each direction. By selecting shims 210 and 220 having certain desired stiffness characteristics, the damping effects caused by piston 130 can be increased or decreased and damping rates can be different between the compression and rebound strokes of piston 130. For example, shims 210 are configured to meter compression flow. Similarly, shims 220 are configured to meter rebound flow. Note that piston apertures (not shown) may be included in planes other than those shown (e.g. other than apertures used by flow paths 126) and further that such apertures may, or may not, be subject to the shims 210 and 220 as shown (because for example, the shims 210 and 220 may be clover-shaped or have some other non-circular shape).

In one embodiment, active main valve 235 is used to drive the opening and closing of flow path 256. The active main valve 235 will move as shown by arrow 236. When active valve is closed, the rebound damping force is increased. In contrast, when active main valve 235 is opened, the rebound damping force is reduced.

Thus, active main valve 235 is used to open, close, or partially open/close fluid flow path 256 to modify the flowrate of the fluid between the rebound side 104 of the cylinder 120 and the compression side 134. In one embodiment, the active operation includes an active signal received by a receiver at active main valve 235 from a computing system. For example, to adjust the flowrate of the fluid between the rebound side 104 of the cylinder 120 and the compression side 134, the command would be provided from the computing system and received at active main valve 235 which would then automatically open, close or partially open fluid flow path 256.

It should be appreciated that in one embodiment, there could be an active main piston valve on a compression side, on a rebound side, or in one embodiment, one or more active main piston valves could be used for both compression and rebound control.

Figure 7:
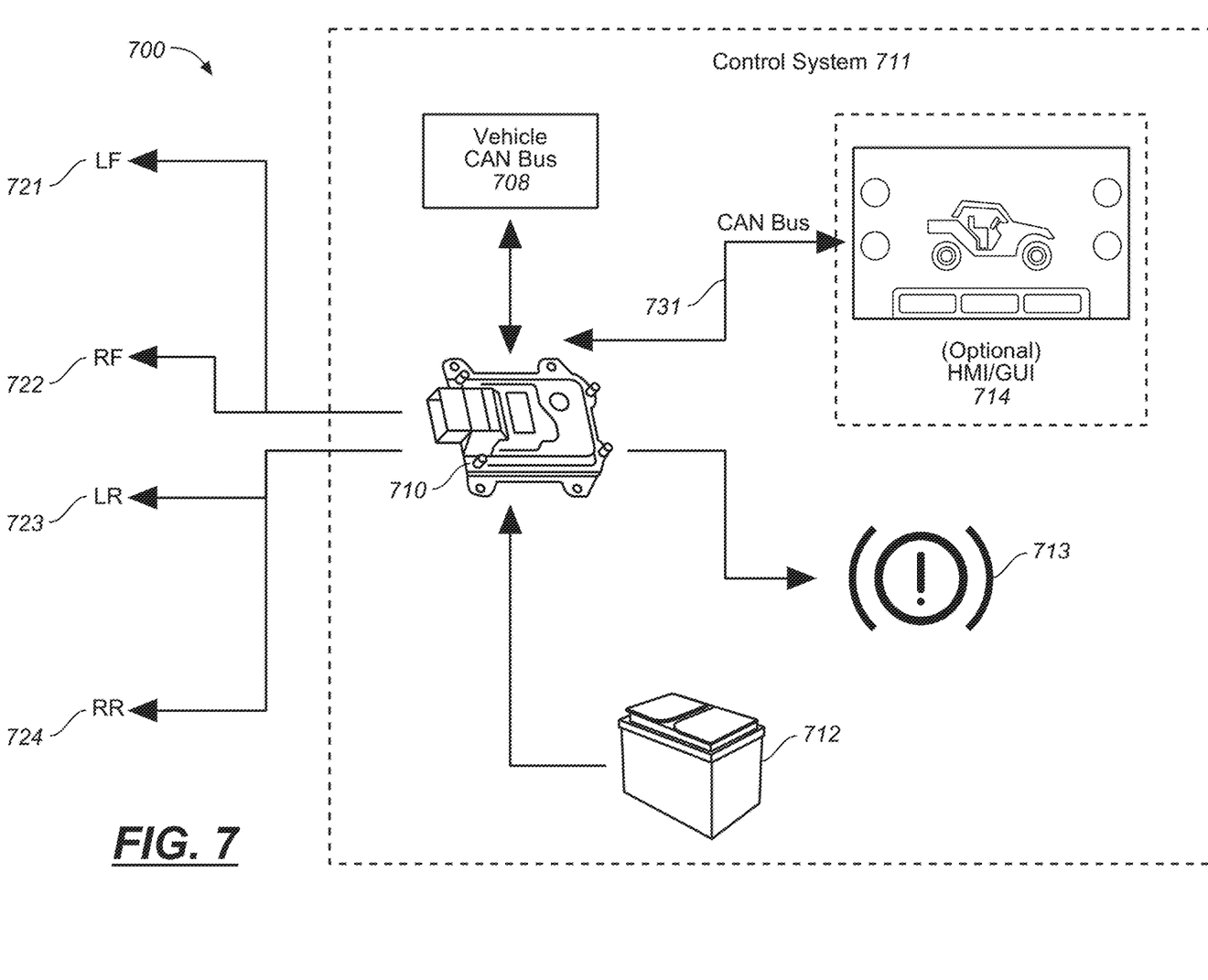
FIG. 7 is a block diagram of an active damping control system, in accordance with an embodiment.

In one embodiment, active main valve 235 will be actuated manually or automatically. In one embodiment, the active operation includes an active signal received by active main valve 235 from a computing device. For example, the user would have an app on a smart phone (or other computing device) and would control the settings via the app, or active main valve 235 would receive input from the computing system such as shown in FIG. 7.

Figure 4:
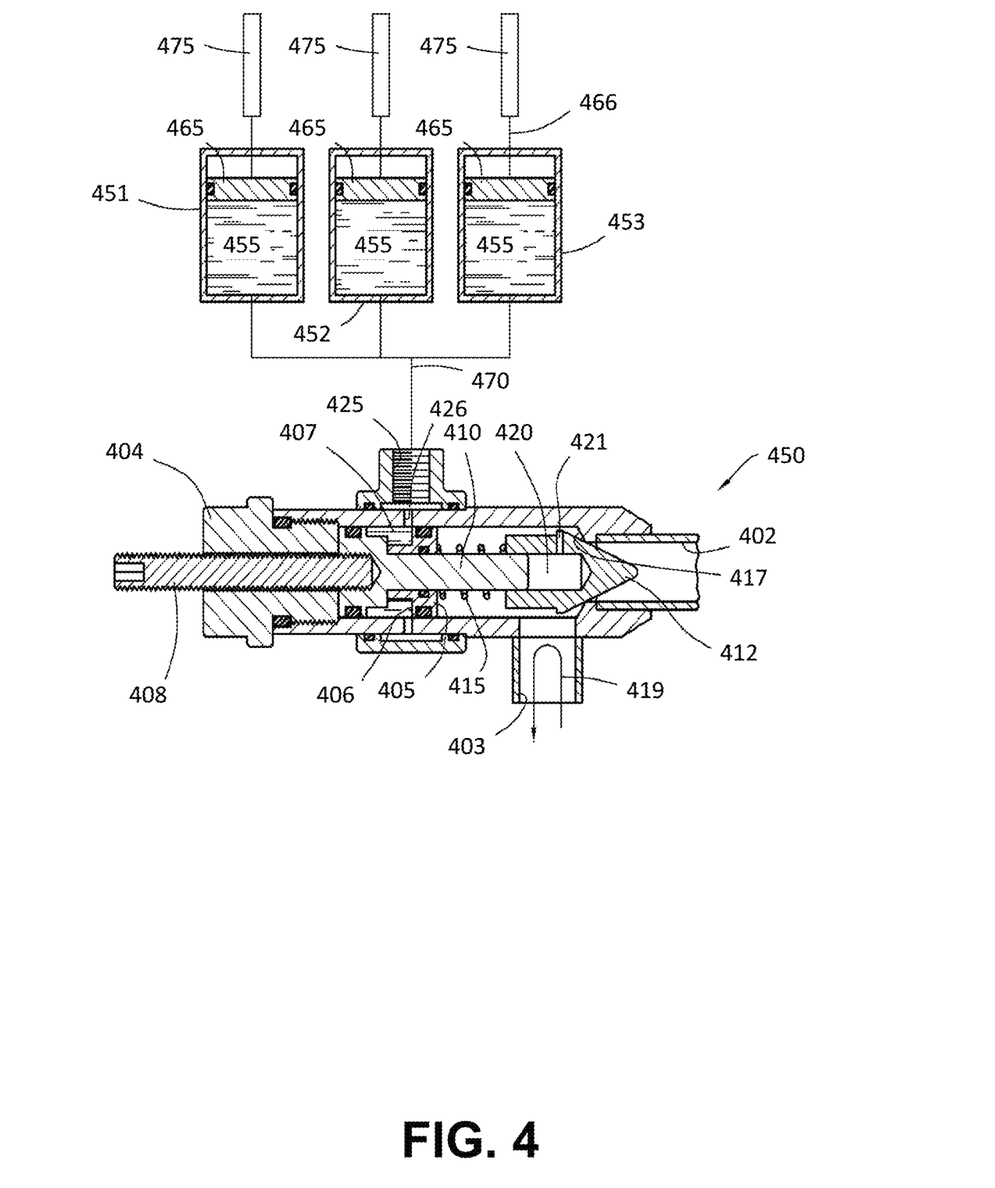
FIG. 4 is a schematic view of an active valve and a plurality of valve operating cylinders in selective communication with an annular piston surface of the active valve, in accordance with an embodiment.
Figure 5:
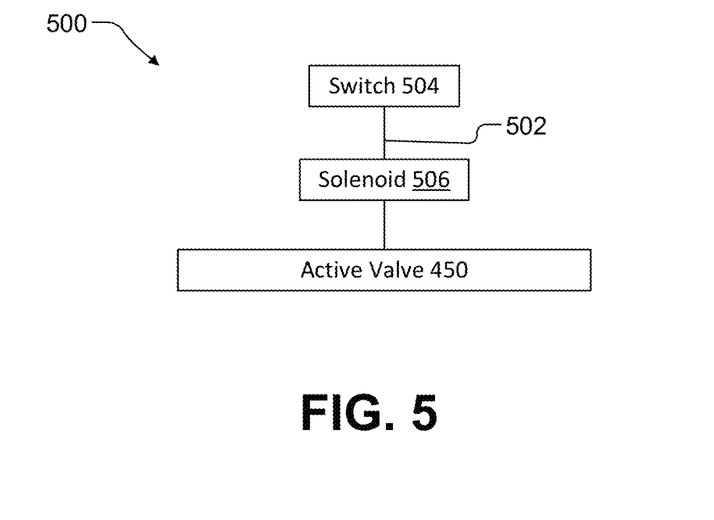
FIG. 5 is a flow diagram showing a control arrangement for an active valve, in accordance with an embodiment.
Figure 6:
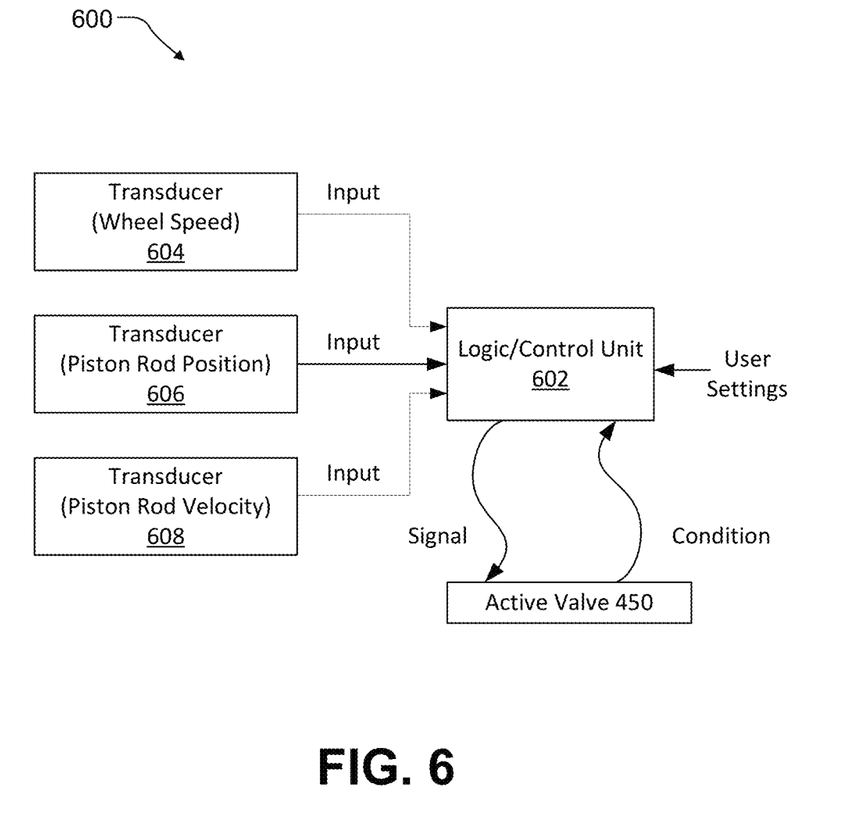
FIG. 6 is a flow diagram of a control system based upon any or all of vehicle speed, damper rod speed, and damper rod position, in accordance with an embodiment.

In general, active main valve 235 is operated in a similar fashion to the active valve 450 the operation of which is shown in FIGS. 4-6.

Although two active valves are shown in FIGS. 1A-1C, it is understood that any number of active valves corresponding to any number of fluid channels (e.g., bypass channels, reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for an internal bypass, for an external bypass, for a fluid conduit to the reservoir, etc. In other words, anywhere there is a fluid flow path within active main valve and base valve damper 100, an active valve could be used. Moreover, the active valve could be alone or used in combination with other active valves at other fluid flow paths to automate one or more of the damping performance characteristics of the dampening assembly. Moreover, additional switches could permit individual operation of separate boost valves. Certain active valve and bypass features are described and shown in U.S. Pat. Nos. 9,120,362; 8,627,932; 8,857,580; 9,033,122; and 9,239,090 which are incorporated herein, in their entirety, by reference. The operation of active valves is described in further detail in FIGS. 4-6.

In one embodiment, the active main valve 235 is employed on the piston 130 directly. In one embodiment, the main piston valve uses an orifice. In one embodiment, instead of an orifice, the active main valve 235 uses other types of flow control such as pressure, hydraulic, or the like. In one embodiment, an orifice type of active valve obtains the bi-directional control by using a needle that is used to open, close, and partially open the orifice to fluid flow.

In one embodiment, such as a single direction control (e.g., unidirectional flow), one embodiment of the active main valve 235 uses a popit (spool, or the like) that acts like a blow-off type valve. For example, a popit with a string behind it can be actively controlled with a solenoid to adjust the opening pressure requirement.

In one embodiment, for the softest setting, the flow paths for the active main valve 235 would be opened. In contrast, the firmest damping setting would be made by closing the active main valve 235 flow paths. In one embodiment, the active main valve 235 is controlled by a power line that travels down a hollowed interior within the shaft of piston rod 142.

In one embodiment, the active valve(s) are solenoid operated, hydraulically operated, pneumatically operated, or operated by any other suitable motive mechanism. For purposes of clarity, the following active valve discussion will refer to the active valve 450. However, it should be appreciated that the active valve discussion can be applied to any active valves in the damping system (e.g., active main valve 235, active base valve 93, and the like).

In one embodiment, the active main valve and base valve damper 100 may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for active main valve and base valve may be cockpit mounted and may be manually adjustable or microprocessor controlled or both or selectively either.

It may be desirable to increase the damping rate or effective stiffness of vehicle suspension damper when moving a vehicle from off-road to on highway use. Off-road use often requires a high degree of compliance to absorb dampers imparted by the widely varying terrain. On highway use, particularly with long wheel travel vehicles, often requires more rigid damper absorption to allow a user to maintain control of a vehicle at higher speeds. This may be especially true during cornering or braking.

One embodiment comprises a four-wheeled vehicle having at least one active main valve and base valve damper at each (of four) wheel.

For example, the opening size of the fluid flow path 256 is automatically adjusted by active valve 450 (including, for example, a remotely controllable active valve 450). In one embodiment, each front active main valve and base valve damper 100 may be electrically connected with a linear switch (such as that which operates an automotive brake light) that is activated in conjunction with the vehicle brake. When the brake is moved beyond a certain distance, corresponding usually to harder braking and hence potential for vehicle nosedive, the electric switch connects a power supply to a motive force generator that causes active main valve and base valve damper 100 to automatically close or partially the fluid paths.

In so doing, the stiffness of active main valve and base valve damper 100 will be increased. As such, the front active main valve and base valve damper 100 will become more rigid during hard braking. Other mechanisms may be used to trigger the active main valve and base valve damper 100 such as accelerometers (e.g. tri-axial) for sensing pitch and roll of the vehicle and activating, via a microprocessor, the appropriate input to cause active main valve and base valve damper 100 to close, open, partially close, or partially open for optimum vehicle damping control.

In one embodiment, a vehicle steering column includes right turn and left turn limit switches such that a hard turn in either direction activates the appropriate adjustment of active main valve and base valve damper 100 to cause active main valve and base valve damper 100 to close, open, partially close, or partially open opposite that direction (for example, a hard, right turn would cause more rigidity in an active main valve and base valve damper 100 on the vehicle's left side). Again, accelerometers in conjunction with a microprocessor and a switched power supply may perform the activation function by sensing the actual g-force associated with the turn (or braking; or acceleration for the rear damper activation) and triggering the appropriate amount of rotation of active valve 450 to cause active main valve and base valve damper 100 to close, open, partially close, or partially open one or more flow paths to a preset acceleration threshold value (e.g., a g-force).

As discussed, a remotely-operable active main valve and base valve damper 100 is particularly useful with an on-/off-road vehicle. These vehicles can have more than 20" of damper absorber travel to permit them to negotiate rough, uneven terrain at speed with usable damper absorbing function. In off-road applications, compliant dampening is necessary as the vehicle relies on its long travel suspension when encountering often large off-road obstacles. Operating a vehicle with very compliant, long travel suspension on a smooth road at road speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated active main valve and base valve damper 100, the working size of one or more flow paths is automatically adjusted thereby modifying the communication of fluid between the rebound side 104 of the cylinder 120 and the compression side 134. Correspondingly, the dampening characteristics of active main valve and base valve damper 100 can be changed.

In addition to, or in lieu of, the simple, switch-operated remote arrangement of FIG. 5, active valve 450 can be operated automatically based upon one or more driving conditions.

Figure 3:
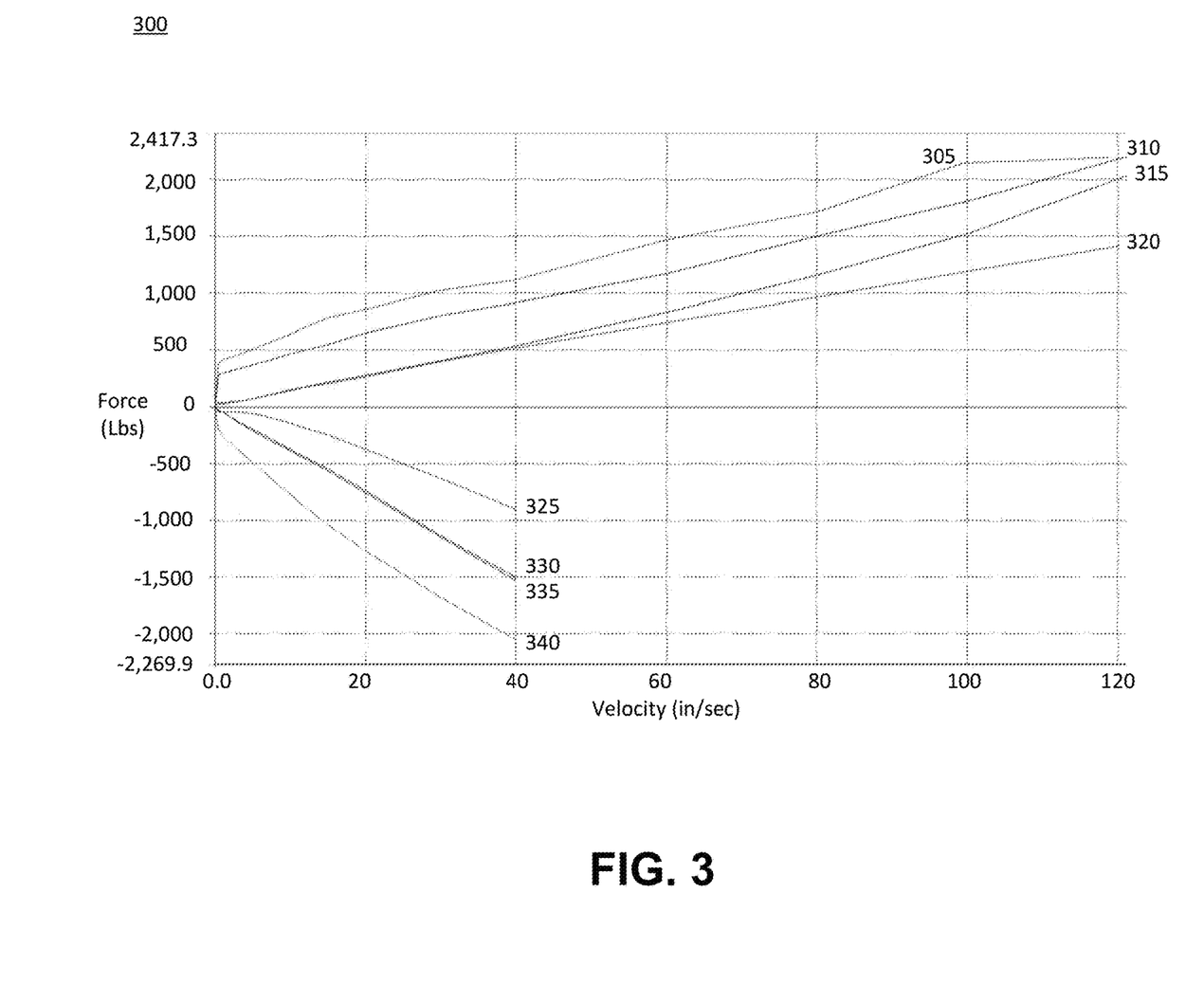
FIG. 3 is a compression force graph in accordance with an embodiment.

FIG. 3 is a graph 300 that shows the difference in force that is obtained during compression and rebound by the use of active base valve 93 and active main valve 235. In general, curves 305, 310, 315, and 320 show the change in force that is obtained in the compression stroke.

In general, curve 320 illustrates the compression range when both the active main valve 235 and the active base valve 93 are open.

Curve 315 illustrates the compression range when the active base valve is open and curve 320 shows the compression curve when the active base valve 93 is closed (e.g., a harder compression setting).

Curve 305 illustrates the compression range when both the active base valve 93 and the active main valve 235 are closed.

In one embodiment, curves 325, 330, 335, and 340 show the change in force that is obtained in the rebound stroke.

In general, curve 325 illustrates the rebound range when both the active main valve 235 and the active base valve 93 are open.

Curve 330 illustrates the compression range when the active base valve 93 is open and curve 335 shows the compression curve when the active base valve 93 is closed.

Curve 340 illustrates the compression range when both the active base valve 93 and the active main valve 235 are closed.

Pressure/Balance

When the shock is pressure balanced, the high pressure is maintained between the main piston and the base valve. This is possible when there is the base valve and the bi-directional main piston valve to allow the pressure balance to be maintained. In one embodiment, pressure is approximately 350 pounds when just a base valve is used, however, in one embodiment, the pressure changes to approximately 450-500 pounds when both the active base valve and the active main piston valve are used.

Active Valve

Referring now to FIG. 4, a schematic view of an active valve 450 is shown in accordance with an embodiment. In one embodiment, the active valve(s) are solenoid operated, hydraulically operated, pneumatically operated, or operated by any other suitable motive mechanism. For purposes of clarity, the following active valve discussion will refer to the active valve 450. However, it should be appreciated that the active valve discussion can be applied to any active valves in the damping system (e.g., active main valve 235, active base valve 93, and the like).

Although FIG. 4 shows the active valve 450 in a closed position (e.g. during a rebound stroke of the damper), the following discussion also includes the opening of active valve 450. Active valve 450 includes a valve body 404 housing a movable piston 405 which is sealed within the body. The piston 405 includes a sealed chamber 407 adjacent an annular piston surface 406 at a first end thereof. The chamber 407 and annular piston surface 406 are in fluid communication with a port 425 accessed via opening 426. Two additional fluid communication points are provided in the body including orifice 402 and orifice 403 for fluid passing through the active valve 450.

Extending from a first end of the piston 405 is a shaft 410 having a cone shaped member 412 (other shapes such as spherical or flat, with corresponding seats, will also work suitably well) disposed on an end thereof. The cone shaped member 412 is telescopically mounted relative to, and movable on, the shaft 410 and is biased toward an extended position due to a spring 415 coaxially mounted on the shaft 410 between the cone shaped member 412 and the piston 405. Due to the spring biasing, the cone shaped member 412 normally seats itself against a valve seat 417 formed in an interior of the valve body 404.

As shown, the cone shaped member 412 is seated against valve seat 417 due to the force of the spring 415 and absent an opposite force from fluid entering the active valve 450 along orifice 402. As cone shaped member 412 telescopes out, a gap 420 is formed between the end of the shaft 410 and an interior of cone shaped member 412. A vent 421 is provided to relieve any pressure formed in the gap. With a fluid path through the active valve 450 (from 403 to 402) closed, fluid communication is substantially shut off from the rebound side of the cylinder into the valve body (and hence to the compression side) and its "dead-end" path is shown by arrow 419.

In one embodiment, there is a manual pre-load adjustment on the spring 415 permitting a user to hand-load or un-load the spring using a threaded member 408 that transmits motion of the piston 405 towards and away from the conical member, thereby changing the compression on the spring 415.

Also shown in FIG. 4 is a plurality of valve operating cylinders 451, 452, 453. In one embodiment, the cylinders each include a predetermined volume of fluid 455 that is selectively movable in and out of each cylindrical body through the action of a separate corresponding piston 465 and rod 466 for each cylindrical body. A fluid path 470 runs between each cylinder and port 425 of the valve body where annular piston surface 406 is exposed to the fluid.

Because each cylinder has a specific volume of substantially incompressible fluid and because the volume of the sealed chamber 407 adjacent the annular piston surface 406 is known, the fluid contents of each cylinder can be used, individually, sequentially or simultaneously to move the piston a specific distance, thereby effecting the damping characteristics of the system in a relatively predetermined and precise way.

While the cylinders 451-453 can be operated in any fashion, in the embodiment shown each piston 465 and rod 466 is individually operated by a solenoid 475 and each solenoid, in turn, is operable from a remote location of the vehicle, like a cab of a motor vehicle or even the handlebar area of a motor or bicycle (not shown). Electrical power to the solenoids 475 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 402 provides adequate force on the cone shaped member 412 to urge it backwards, at least partially loading the spring 415 and creating a fluid flow path from the orifice 402 into and through orifice 403.

The characteristics of the spring 415 are typically chosen to permit active valve 450 to open at a predetermined pressure, with a predetermined amount of control pressure applied to port 425. For a given spring 415, higher control pressure at port 425 will result in higher pressure required to open the active valve 450 and correspondingly higher damping resistance in orifice 402. In one embodiment, the control pressure at port 425 is raised high enough to effectively "lock" the active valve closed resulting in a substantially rigid compression damper (particularly true when a solid damping piston is also used).

In one embodiment, the valve is open in both directions when the cone shaped member 412 is "topped out" against valve body 404. In another embodiment however, when the piston 405 is abutted or "topped out" against valve body 404 the spring 415 and relative dimensions of the active valve 450 still allow for the cone shaped member 412 to engage the valve seat 417 thereby closing the valve. In such embodiment backflow from the rebound side to the compression side is always substantially closed and cracking pressure from flow along orifice 402 is determined by the pre-compression in the spring 415. In such embodiment, additional fluid pressure may be added to the inlet through port 425 to increase the cracking pressure for flow along orifice 402 and thereby increase compression damping. It is generally noteworthy that while the descriptions herein often relate to compression damping and rebound shut off, some or all of the channels (or channel) on a given suspension unit may be configured to allow rebound damping and shut off or impede compression damping.

While the examples illustrated relate to manual operation and automated operation based upon specific parameters, in various embodiments, active valve 450 can be remotely-operated and can be used in a variety of ways with many different driving and road variables and/or utilized at any point during use of a vehicle. In one example, active valve 450 is controlled based upon vehicle speed in conjunction with the angular location of the vehicle's steering wheel. In this manner, by sensing the steering wheel turn severity (angle of rotation and rotational velocity), additional damping (by adjusting the corresponding size of the opening of orifice 402 by causing cone shaped member 412 to open, close, or partially close orifice 402) can be applied to one shock absorber or one set of vehicle shock absorbers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 450 (and corresponding change to the working size of the opening of orifice 402 by causing cone shaped member 412 to open, close, or partially close orifice 402) in response thereto. In another example, active valve 450 is controlled at least in part by a pressure transducer measuring pressure in a vehicle tire and adding damping characteristics to some or all of the wheels (by adjusting the working size of the opening of orifice 402 by causing cone shaped member 412 to open, close, or partially close orifice 402) in the event of, for example, an increased or decreased pressure reading.

In one embodiment, active valve 450 is controlled in response to vehicle changes in motion (e.g., acceleration, deceleration, etc.). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 402 by causing cone shaped member 412 to open, close, or partially close orifice 402 chambers) in the event of a loss of control to help the operator of the vehicle to regain control.

For example, active valve 450, when open, permits a first flow rate of the working fluid through orifice 402. In contrast, when active valve 450 is partially closed, a second flow rate of the working fluid though orifice 402 occurs. The second flow rate is less than the first flow rate but greater than no flow rate. When active valve 450 is completely closed, the flow rate of the working fluid though orifice 402 is statistically zero.

In one embodiment, instead of (or in addition to) restricting the flow through orifice 402, active valve 450 can vary a flow rate through an inlet or outlet passage within the active valve 450, itself. See, as an example, the active valve of FIGS. 2-4 of U.S. Pat. No. 9,353,818 which is incorporated by reference herein, in its entirety, as further example of different types of "active" or "active" valves). Thus, the active valve 450, can be used to meter the working fluid flow (e.g., control the rate of working fluid flow) with/or without adjusting the flow rate through orifice 402.

Due to the active valve 450 arrangement, a relatively small solenoid (using relatively low amounts of power) can generate relatively large damping forces. Furthermore, due to incompressible fluid inside the active valve damper 38, damping occurs as the distance between cone shaped member 412 and orifice 402 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the valve body 404 rotates in a reverse direction than that described above and herein, the cone shaped member 412 moves away from orifice 402 providing at least a partially opened fluid path.

FIG. 5 is a flow diagram of a control arrangement 500 for a remotely-operated active valve 450. As illustrated, a signal line 502 runs from a switch 504 to a solenoid 506. Thereafter, the solenoid 506 converts electrical energy into mechanical movement and rotates valve body 404 within active valve 450, In one embodiment, the rotation of valve body 404 causes an indexing ring consisting of two opposing, outwardly spring-biased balls to rotate among indentions formed on an inside diameter of a lock ring.

As the valve body 404 rotates, cone shaped member 412 at an opposite end of the valve is advanced or withdrawn from an opening in orifice 402. For example, the valve body 404 is rotationally engaged with the cone shaped member 412. A male hex member extends from an end of the valve body 404 into a female hex profile bore formed in the cone shaped member 412. Such engagement transmits rotation from the valve body 404 to the cone shaped member 412 while allowing axial displacement of the cone shaped member 412 relative to the valve body 404. Therefore, while the body does not axially move upon rotation, the threaded cone shaped member 412 interacts with mating threads formed on an inside diameter of the bore to transmit axial motion, resulting from rotation and based on the pitch of the threads, of the cone shaped member 412 towards or away from an orifice 402, between a closed position, a partially open position, and a fully or completely open position.

Adjusting the opening of orifice 402 modifies the flowrate of the fluid through active valve 450 thereby varying the stiffness of a corresponding active valve damper 38. While FIG. 5 is simplified and involves control of a single active valve 450, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system.

For example, a suspension damper could have one, a combination of, or each of an active valve(s). The active valve(s) could be used for fluid flow path control, for bottom out control, for an internal bypass, for an external bypass, for a fluid conduit to the external reservoir 125, etc. In other words, anywhere there is a fluid flow path within active valve damper 38, an active valve could be used. Moreover, the active valve could be alone or used in combination with other active (semi-active, or passive) valves at other fluid flow paths to automate one or more of the damping performance characteristics of the damping assembly. Moreover, additional switches could permit individual operation of separate active bottom out valves.

In addition to, or in lieu of, the simple, switch-operated remote arrangement of FIG. 5, the remotely-operable active valve 450 can be operated automatically based upon one or more driving conditions, and/or automatically or manually utilized at any point during use of a vehicle.

FIG. 6 is a flow diagram of a control system 600 based upon any or all of vehicle speed, damper rod speed, and damper rod position. One embodiment of the arrangement of control system 600 is designed to automatically increase damping in a shock absorber in the event a damper rod reaches a certain velocity in its travel towards the bottom end of a damper at a predetermined speed of the vehicle.

In one embodiment, the control system 600 adds damping (and control) in the event of rapid operation (e.g. high rod velocity) of the active valve damper 38 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 402 by causing cone shaped member 412 to open, close, or partially close orifice 402) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 450 for changing the working size of the opening of orifice 402 by causing cone shaped member 412 to open, close, or partially close orifice 402. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper or other connected suspension element such as the tire, wheel, or axle assembly. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 450 (e.g., the logic unit 602 is an activation signal provider) to cause active valve 450 to move into the desired state (e.g., adjust the flow rate by adjusting the distance between cone shaped member 412 and orifice 402). Thereafter, the condition, state, or position of active valve 450 is relayed back to logic unit 602 via an active valve monitor or the like.

In one embodiment, logic unit 602 shown in FIG. 6 assumes a single active valve 450 corresponding to orifice 402 of active valve damper 38, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

Referring now to FIG. 7, a block diagram of a modular active damping control system 700 is shown in accordance with an embodiment. Modular active damping control system 700 includes a plurality of damping components (hereinafter dampers 721-724) and a control system 711.

In one embodiment, there is at least one damper, of the plurality of damping components, located at each of a vehicle wheel suspension location. For example, damper 721 at the left front, damper 722 at the right front, damper 723 at the left rear, and damper 724 at the right rear.

In one embodiment, the plurality of damping components, e.g., dampers 721-724, are selected from the damper types such as, an in-line damper, a piggyback damper, a compression adjust only damper, a rebound adjust only damper, an independent compression and rebound adjust damper, a dependent compression and rebound adjust single valve damper, and the like. A plurality of different damper 721-724 types are shown and described in the discussion of FIGS. 1A-2.

Although active damping control system 700 is shown as interacting with four dampers 721-724 such as would be likely found in a four wheeled vehicle suspension configuration, it should be appreciated that the technology is well suited for application in other vehicles with different suspension configurations. The different configurations can include two wheel suspension configuration like that of a motorcycle; a one, two or three "wheel" suspension configuration like that of a snowmobile, trike, or boat, a plurality of dampers at each of the damper suspension locations such as found in off-road vehicles, UTV, powersports, heavy trucking, RV, agriculture, maritime, and the like. The use of a single damper in a four suspension location configuration as shown herein is provided merely as one example.

In one embodiment, control system 711 includes shimmed damping control (SDC) 710, vehicle CAN bus 708, CAN Bus 731 to an optional human machine interface (HMI) 714 (or graphical user interface (GUI)), warning 713, and battery 712. It should be appreciated that in an embodiment, one or more components shown within control system 711 would be located outside of control system 711, and similarly additional components would be located within control system 711.

In one embodiment, SDC 710 includes a processor. In operation, both compression and rebound oil flows through independent sophisticated multistage blended circuits in SDC 710 to maximize suspension control. In one embodiment, SDC 710 will control each of the plurality of damping components located at each vehicle wheel suspension location, determine a type of damping component at each vehicle wheel suspension location, automatically tune a vehicle suspension based on the determined type of damping components at each vehicle wheel suspension location, automatically monitor the plurality of damping components and determine when a change has been made to one or more of the plurality of damping components, and automatically re-tune the vehicle suspension based on the change to one or more of the plurality of damping components.

In one embodiment, there is no need for HMI/GUI 714 within the modular active damping control system 700. Instead, the suspension configuration will be identified by the warning 713 or lack thereof. In another embodiment, there may be suspension configuration switches instead of an HMI/GUI 714.

In one embodiment, optional HMI/GUI 714 is a GUI that presents a damping configuration and operational information about the damping configuration, e.g., vehicle suspension settings, in a user interactive format, such as on a display located proximal to a vehicle operator.

In one embodiment, optional HMI/GUI 714 is configured to present vehicle suspension setting information in a user interactive format on a display, where the HMI will have a touch input capability to receive an input from a user via a user interaction with the HMI. HMI is also programmable to present damping configuration information, rebound configuration information and/or suspension setting information in a user interactive format on a display.

In one embodiment, the vehicle suspension setting information includes a plurality of different vehicle suspension mode configurations and an identification of which configuration mode is currently active on the vehicle suspension. In one embodiment, the plurality of different vehicle suspension mode configurations is user selectable.

If one or more of the components of dampers 721-724 are automatically adjustable, in one embodiment, control system 711 will automatically adjust one or more of the plurality of damping components of the tuned vehicle suspension based on external conditions such as, weather, terrain, ground type (e.g., asphalt, concrete, dirt, gravel, sand, water, rock, snow, etc.), and the like.

In one embodiment, control system 711 will automatically adjust one or more of the plurality of damping components (dampers 721-724) of the tuned vehicle suspension based on one or more sensor inputs received from sensors such as an inertial gyroscope, an accelerometer, a magnetometer, a steering wheel turning sensor, a single or multi spectrum camera, and the like.

In one embodiment, the active damping control system 700 characteristics can be set at the factory, manually adjustable by a user, or automatically adjustable by a computing device using environmental inputs and the like. For example, the suspension characteristics for the dampers 721-724 are manually or automatically adjustable based on user preference, speed, maneuvering, ride type, or the like.

In one embodiment, the adjustable characteristics for the dampers 721-724 are manually adjustable via a user input. For example, via user interaction with HMI/GUI 714.

In one embodiment, the adjustable characteristics for the dampers 721-724 are automatically adjusted based on external conditions, e.g., sensors detecting damper, vibration, or the like. For example, in a smooth operating environment, e.g., on a highway or smooth road, configuration adjustments may be provided by the user via HMI 714, or automatically applied by active damping control system 700, to increase firmness in the ride. That is, to provide additional hardness that would increase feedback, feel and precise handling.

In contrast, when rougher terrain is encountered, the user can select a rough terrain setting at HMI 714. In contrast, the active damping control system 700 would receive information from one or more sensors (coupled to the suspension near dampers 721-724, via the Vehicle CAN bus 708, or the like) about the rough terrain and re-tune the vehicle suspension based on to a softer setting. That is, to provide appropriate suspension control characteristics for the vehicle. In addition, the adjustment provides a softer ride that would reduce operator/passenger felt vibrations, damper, bumps, and the like thereby reducing operator fatigue and/or.

As described herein, the manual option includes a user selectable switch, icon on a touch display, or the like at the GUI or HMI, that allows a user to make a selection based on given characteristics, e.g., highway mode—for smooth terrain, -off-road mode—for rough terrain, a mixed mode for intermediate terrain, etc. In one embodiment, the manual option is provided at the GUI or HMI. In one embodiment, the manual option may be one or more switches that allow the use to select one or more pre-defined suspension settings. For example, the pre-defined suspension settings can include, but are not limited to, highway, offroad, mixed terrain, rock climbing, racing, performance, sport, wet, and the like.

In an automated mode, active damping control system 700 automatically adjusts one or more characteristics for one or more dampers 721-724 based on based on one or more inputs received at the processor of SDC 710. For example, in one embodiment, the steering inputs, vehicle roll, speed, and the like are detected and/or monitored via one or more sensors on or about the vehicle. Similarly, external conditions such as weather, terrain, ground type, and the like are also detected and/or monitored via the one or more sensors on or about the vehicle.

Sensors such as but not limited to, accelerometers, sway sensors, suspension changes, visual identification technology (e.g., single or multi spectrum camera's), driver input monitors, steering wheel turning sensors, and the like. For example, one embodiment uses an inertial measurement unit (IMU) to sense rough terrain. One embodiment has an attitude and heading reference system (AHRS) that provides 3D orientation integrating data coming from inertial gyroscopes, accelerometers, magnetometers and the like. For example, in one embodiment, the AHRS is a GPS aided Microelectromechanical systems (MEMS) based IMU and static pressure sensor.

Moreover, if the active damping control system 700 determines that one or more of dampers 721-724 are remotely adjustable, active damping control system 700 will be able to adjust those dampers automatically and on the fly. For example, active damping control system 700 will set the remotely adjustable dampers into a highway mode during travel down a roadway, e.g., that is configuring the remotely adjustable dampers to operate in a firmer mode, and then as the vehicle transitions to rougher terrain, the remotely adjustable dampers will be reconfigured to a softer setting to increasing absorption of damper and thereby provide a smoother ride.

In one embodiment, the automated or user selectable settings are further adjustable based on actual conditions or as "learned" user settings. For example, if an operator initially sets the active damping control system 700 to a rough terrain setting and then the vehicle transitions to a roadway, fire road, highway, or the like. When the sensor feedback causes the active damping control system 700 to determine that the vehicle is no longer in rough terrain, active damping control system 700 would automatically change the mode to highway mode to provide a more appropriate suspension setting. However, if the operator prefers a harder feel, the operator will override any automatic "on-the-fly" adjustments so that off-road mode is maintained. Similarly, if the user prefers a softer ride, or has been in the seat for a long period of time, the user will adjust the stiffness mode to be a softer seat, provide a smoother ride, or the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What is claimed is:

1. A damper comprising:
    a reservoir;
    a cylinder, said cylinder comprising a cylinder inner diameter (ID), no portion of said reservoir is concentrically disposed about a compression side or a rebound side of said cylinder, said cylinder fluidly coupled with said reservoir;
    a rod;
    a piston, said piston coupled to said rod and configured for operation within said cylinder, said piston configured to divide said cylinder into said compression side and said rebound side;
    an active base valve, said active base valve to provide flow control for a reservoir flow path between said cylinder and said reservoir; and
    an active main valve, said active main valve to provide flow control for a piston flow path fluidly coupling said compression side with said rebound side, said flow control for said reservoir flow path and said flow control for said piston flow path are independently controllable with respect to each other, said active main valve configured to automatically adjust its operation, and corresponding damping characteristics based upon operational information pertaining to said damper, said active base valve and said active main valve configured to cooperatively maintain a selected pressure within said compression side of said cylinder between said piston and said active base valve during operation of said damper, and wherein said active base valve and said active main valve are configured to cooperatively pressure balance said damper during operation.

2. The damper of claim 1, wherein said damper is a monotube.

3. The damper of claim 1, wherein said piston further comprises:
    at least one piston fluid channel therethrough, said at least one piston fluid channel to fluidly couple said compression side with said rebound side, said at least one piston fluid channel controlled by a pre-set shim stack.

4. The damper of claim 1, further comprising:
    a remote control, said remote control configured to remotely configure a setting of said active base valve.

5. The damper of claim 1, further comprising:
    a remote control, said remote control configured to remotely configure a setting of said active main valve.

6. The damper of claim 1, wherein said active base valve provides a compression adjustment capability for said damper.

7. The damper of claim 1, wherein said active main valve provides a rebound adjustment capability for said damper.

8. The damper of claim 1, wherein said active main valve provides both a compression adjustment capability and a rebound adjustment capability for said damper.

9. A damper comprising:
    a reservoir;
    a cylinder, said cylinder fluidly coupled with said reservoir, said cylinder comprising:
        an actual cylinder inner diameter (ID), and
        a working fluid therein, wherein said reservoir and said cylinder are separate fluid chambers;
    a rod;
    a piston, said piston coupled to said rod and configured for operation within said cylinder, said piston configured to divide said cylinder into said compression side and said rebound side, said piston comprising:
        a piston fluid channel therethrough, said piston fluid channel to fluidly couple said compression side with said rebound side;
        a compression valve stack on said compression side; and
        a rebound valve stack on said rebound side, said compression valve stack and said rebound valve stack comprising a bi-directional piston valve;

an active base valve, said active base valve to provide flow control for a reservoir flow path between said cylinder and said reservoir; and an active main valve, said active main valve configured to control said bi-directional piston valve and provide flow control for a piston flow path fluidly coupling said compression side with said rebound side, said flow control for said reservoir flow path and said flow control for said piston flow path are independently controllable with respect to each other, said active main valve configured to automatically adjust its operation, and corresponding damping characteristics based upon operational information pertaining to said damper, said active base valve and said active main valve configured to cooperatively maintain a selected pressure between said piston and said active base valve and throughout a ride zone region of said damper during operation of said damper, and wherein said active base valve and said active main valve are configured to cooperatively pressure balance said damper during operation.

10. The damper of claim 9, wherein said damper is a monotube.

11. The damper of claim 9, wherein said piston further comprises:
at least one additional piston fluid channel therethrough, said at least one additional piston fluid channel to fluidly couple said compression side with said rebound side, said least one additional piston fluid channel controlled by a pre-set shim stack.

12. The damper of claim 9, further comprising:
a remote control, said remote control configured to remotely configure a setting of said active base valve.

13. The damper of claim 9, further comprising:
a remote control, said remote control configured to remotely configure a setting of said active main valve.

14. The damper of claim 9, wherein said active base valve provides a compression adjustment capability for said damper.

15. The damper of claim 9, wherein said active main valve provides a rebound adjustment capability for said damper.

16. The damper of claim 9, wherein said active main valve provides both a compression adjustment capability and a rebound adjustment capability for said damper.

17. A method for actively controlling rebound and compression in a damper said method comprising:
providing an active base valve between a cylinder and a reservoir of said damper, said active base valve providing flow control for a reservoir flow path between said cylinder and said reservoir, wherein said cylinder and said reservoir are not concentrically disposed with respect to each other; and providing an active main valve in a piston of said damper, said active main valve providing flow control for a piston flow path fluidly coupling a compression side of said damper with a rebound side of said damper, wherein said flow control for said reservoir flow path and said flow control for said piston flow path are independently controllable with respect to each other, said active main valve configured to automatically adjust its operation, and corresponding damping characteristics based upon operational information pertaining to said damper, said active base valve and said active main valve configured to cooperatively maintain a selected pressure in said compression side of said damper between said piston and said active base valve during operation of said damper, and wherein said active base valve and said active main valve are configured to cooperatively pressure balance said damper during operation.

18. The method of claim 17 further comprising:
utilizing a remote device to provide a compression adjustment to said active base valve.

19. The method of claim 17 further comprising:
utilizing a remote device to provide a rebound adjustment to said active main valve.

* * * * *